United States Patent [19]
Patsiokas et al.

[11] Patent Number: 5,109,400
[45] Date of Patent: Apr. 28, 1992

[54] COMMUNICATION SYSTEM WITH REGISTRATION AND TWO WAY RADIO

[75] Inventors: Stelios J. Patsiokas, Plantation, Fla.; William V. Braun, Elmhurst, Ill.

[73] Assignee: Motorola, Inc., Schaumburg, Ill.

[21] Appl. No.: 345,155

[22] Filed: Apr. 28, 1989

[51] Int. Cl.$^5$ .............................................. H04Q 7/04
[52] U.S. Cl. ...................................... 379/57; 379/89; 379/211; 379/60; 455/33.1
[58] Field of Search ....................... 379/58, 59, 63, 60, 379/89, 210, 211, 212; 455/33

[56] References Cited

U.S. PATENT DOCUMENTS

| | | | |
|---|---|---|---|
| 4,611,094 | 9/1986 | Asmuth et al. | 379/89 |
| 4,731,811 | 3/1988 | Dubus | 379/58 |
| 4,748,655 | 5/1988 | Thrower et al. | 379/60 |
| 4,775,999 | 10/1988 | Williams | 379/59 |
| 4,809,321 | 2/1989 | Morganstein et al. | 379/214 X |
| 4,833,701 | 5/1989 | Comroe et al. | 379/60 |
| 4,833,702 | 5/1989 | Shitara et al. | 379/60 |

Primary Examiner—James L. Dwyer
Assistant Examiner—M. Shehata
Attorney, Agent, or Firm—Michael J. Buchenhorner;—Daniel K. Nichols

[57] ABSTRACT

A radio communication system with on/off premise registration is provided. When a radio is registered with the system, incoming calls for the radio are directed to the radio via the system. When the radio is registered as off the system information is transmitted to the radio as via a wide area system. A voice mailbox is provided for storing messages when the radio is unavailable.

2 Claims, 2 Drawing Sheets

COMMUNICATION SYSTEM WITH REGISTRATION AND TWO WAY RADIO

BACKGROUND OF THE INVENTION

This invention relates to communication systems in general, and particularly to a communication system in which a radio can be registered with the system. Use of two-way radios offers advantages over the use of wired telephones, as for example, in a building or other site. The use of such a radio or personal communicator allows the user to be in constant telephone communication regardless of his location away from a fixed telephone. However, when the user leaves the building or site, communication with the user via the system is typically not possible. Where a telephone or other call is received at the site, while the user is off-site, it would be desirable to provide a method of advising the user of receipt of the call.

SUMMARY OF THE INVENTION

This communication system has means for recognizing that a call has been received for a radio that is "off-site".

The communication system includes means for receiving incoming calls. The system determines whether the called radio is registered on the system or off the system, and connects the ratio with the call if the radio is registered on the system and transmits information to the radio if it is registered off the system. In one aspect of the invention, the system accesses a paging system to cause a page to be transmitted to the radio if it is off the system. In another aspect of the invention, the system forwards the call to a wide-area two-way radio system if the radio is off the system. In still another aspect of the invention, voice storage means are provided for storing messages when the radio is unavailable.

DESCRIPTION OF THE PREFERRED EMBODIMENT

Figure 1:
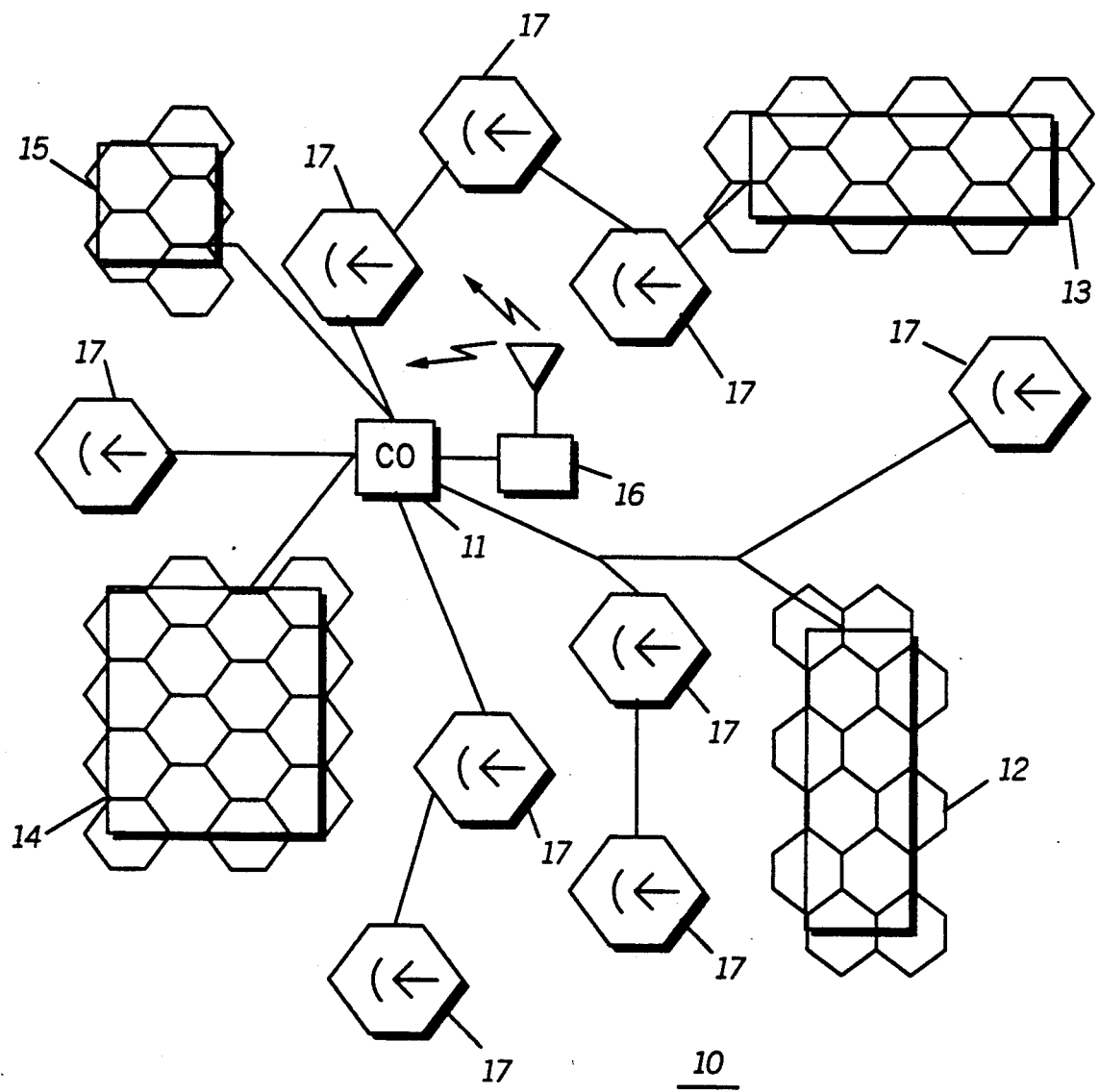
FIG. 1 is a block diagram of a communication system in accordance with the present invention.

Referring now by characters of reference to the drawings and first to FIG. 1, an integrated communication system 10 is illustrated. The system makes use of the central office of a conventional telephone system for providing an interconnection of various individual systems. Individual or building site systems 12, 13, 14, and 15 can communicate with the central office 11. A wide area communication system, such as a paging system 16 is also accessed via the central office 11. A plurality of Call-Point stations 17 are illustrated connected to the central office. The Call-Point stations 17 permit a radio to access the telephone network when in range of an individual call point station. Alternatively, a wide area two-way radio system can be utilized rather than the paging system 16 and Call-Point Stations 17. The wide area system can be utilized by the systems 12, 13, 14, and 15 as well as by other users.

Figure 2:
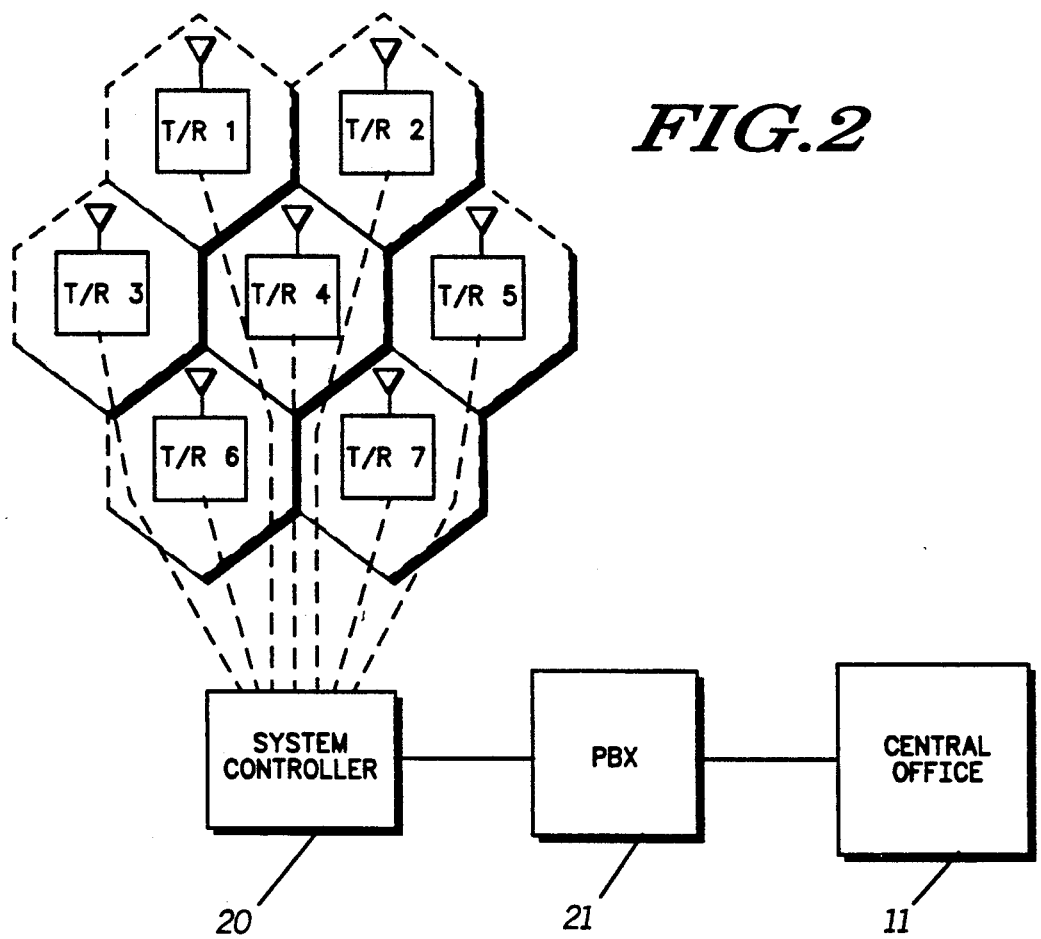
FIG. 2 is a block diagram of a site communication system in accordance with the present invention.

A site communication system, as for example, site 14 is illustrated in FIG. 2. For convenience, only 7 cell stations labeled T/R1-7 are illustrated. This is a micro cellular system in which low power cells and portable radios are used to cover a building or other site. Each of the cell stations T/R1-7 can include a plurality of RF channels, and are connected to a system controller 20. A PRX 21 at the site serves as the interface between the lines from the central office 11 and the system controller 20.

Figure 3:
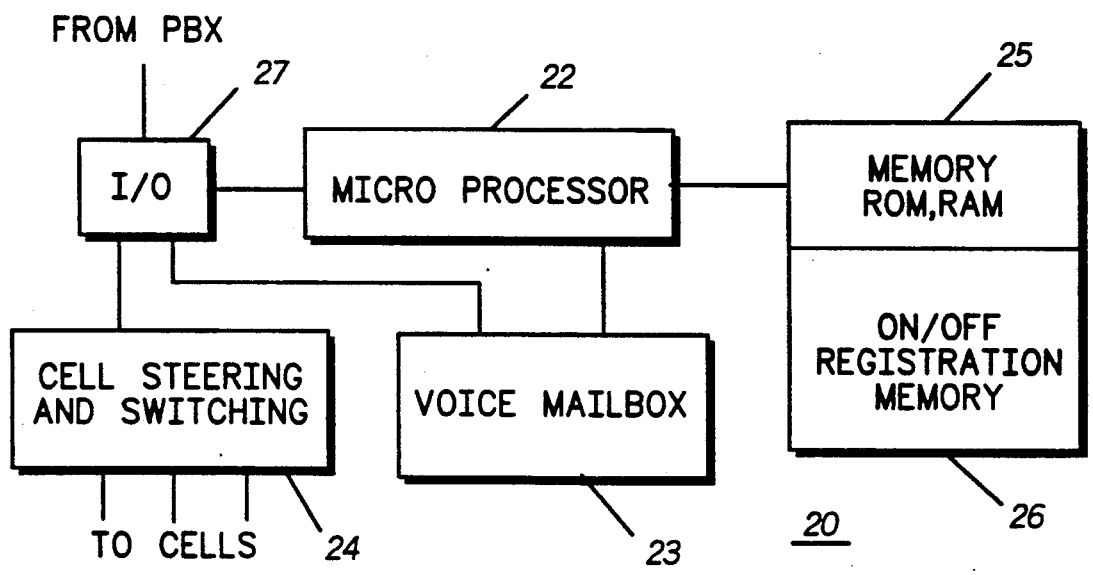
FIG. 3 is a block diagram diagram of a system controller of FIG. 2.

A block diagram of the system controller 20 is illustrated in FIG. 3. The system controller 20 includes an I/O 27 which is tied back to the PBX 21 and as well as to a microprocessor controller 22, voice mailbox unit 23, and a cell steering and switching circuit 24. The microprocessor controller 22 typically is connected to RAM and ROM memory 25 which can include a portion utilized for ON/OFF site registration 26.

In operation, when a call is received from the central office 11 by PBX 21, the microprocessor 22 determines whether the called radio is registered as being on-site or off-site. If the radio is on-site, the call is processed using the local on-site protocol. If the radio is not on-site, the controller 22 determines if the radio has registered to have calls stored or messages forwarded to the wide area system 16. If messages are to be stored, an appropriate message is given to the caller and the response is directed to the voice mailbox 23. If instead, it is determined that the radio is registered for having calls forwarded, the caller is given an appropriate message, such as to leave a return phone number. The system controller 20, then accesses the paging system 16 via the central office to page the radio and provide the return number of the caller. The radio can then utilize a Call-Point station 17 to return the call. If the radio has access to a wide-area two-way system, the system controller 20 can have the call forwarded via the PBX 21 to the wide area system and a two-way conversation can, thereby be established.

In use the radio on power up determines if the signal from the on-site system is available. If the signal is not available, the radio goes to the wide area signalling at the appropriate frequency of the wide area signalling system 16 and adjusts operating parameters such as frequency and data bit rate for proper operation on that system. If the on-site system signalling is detected, the radio will synchronize to digital transmission and register by transmitting the appropriate signal and radio identification to the system. In the event that the user leaves the premises an off-site registration can occur in which event the radio will switch frequency to monitor the paging system 16. Off-site registration can be automatic, or the radio user can enter a command to transmit an appropriate signal to indicate whether the radio will be on-site or off-site. Another command can be used to direct calls for voice storage.

We claim as our invention:

1. A site communication system comprising:
   means for receiving incoming calls directed to a radio;
   means for determining whether the radio is registered on the site system or off the site system, and for determining whether the radio has registered to have calls stored or information forwarded to a wide area system;
   means for connecting the radio with the call if the radio is registered on the site system,
   means for transmitting information to the radio via the wide area system if the radio is registered off the site system and the radio has registered to have information forwarded to a wide area system; and voice storage means for storing messages when the radio is not registered on the site system and is registered to have messages stored.

2. A communication system as defined in claim 1, in which the means for receiving incoming calls includes a PBX for receiving telephone calls.

* * * * *